United States Patent
Blankinship et al.

(10) Patent No.: US 9,715,025 B2
(45) Date of Patent: Jul. 25, 2017

(54) NORMALIZATION OF SECTOR AMPLITUDES USING MONOPOLE AMPLITUDES

(71) Applicant: Weatherford/Lamb, Inc., Houston, TX (US)

(72) Inventors: Thomas J. Blankinship, Fort Worth, TX (US); Peter J. Schoch, Benbrook, TX (US); Lucio N. Tello, Houston, TX (US); Gregory J. Caston, Fort Worth, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 413 days.

(21) Appl. No.: 14/463,289

(22) Filed: Aug. 19, 2014

(65) Prior Publication Data
US 2016/0054461 A1 Feb. 25, 2016

(51) Int. Cl.
- *G01V 1/40* (2006.01)
- *G01V 1/44* (2006.01)
- *G01V 1/02* (2006.01)
- *E21B 47/00* (2012.01)

(52) U.S. Cl.
CPC ............ *G01V 1/02* (2013.01); *G01V 1/44* (2013.01); *E21B 47/0005* (2013.01); *G01V 1/40* (2013.01)

(58) Field of Classification Search
CPC ... G01V 1/50; G01V 1/40; G01V 1/44; E21B 47/0005
USPC .................................. 367/35, 28; 181/105
See application file for complete search history.

(56) References Cited

U.S. PATENT DOCUMENTS

| | | | |
|---|---|---|---|
| 5,377,160 A | 12/1994 | Tello et al. | |
| 5,907,131 A * | 5/1999 | Tello | E21B 47/0005 181/102 |
| 2006/0067162 A1 | 3/2006 | Blankinship et al. | |
| 2007/0070809 A1 | 3/2007 | Hurst et al. | |

OTHER PUBLICATIONS

Combined Search and Examination Report in counterpart UK Appl. GB 1514716.8; dated Jan. 15, 2016; pp. 1-5.
Song, et al.; "Numerical Simulation of Sector Bond Log and Improved Cement Bond Image"; Geophysics; vol. 77; No. 4; Jul.-Aug. 2012; pp. D95-D104.

* cited by examiner

*Primary Examiner* — Ian J Lobo
(74) *Attorney, Agent, or Firm* — Blank Rome LLP

(57) ABSTRACT

A method and apparatus for normalizing an acoustic wellbore tool by correcting measured sector acoustic signals due to changes in pressure and temperature downhole, the method and apparatus comprising an acoustic wellbore tool having at least one monopole transmitter and monopole receiver, and one or more sector transmitters and receivers disposed along the longitudinal axis of the tool, determining the attenuation values of received monopole and sector acoustic signals, determining a correction ratio using an average sector attenuation value and a theoretical attenuation value, and correcting the sector acoustic signals using the correction ratio.

20 Claims, 8 Drawing Sheets

NORMALIZATION OF SECTOR AMPLITUDES USING MONOPOLE AMPLITUDES

BACKGROUND OF THE DISCLOSURE

Acoustic well logging tools have long been used for evaluating cementing conditions of casings in cased wells. Cement bonding is a term which has been used to describe the measure of the average compressive strength of cement disposed around a section of casing within a wellbore. This measure of cement compressive strength provides an indication of the cementing conditions within the wellbore, such as whether the cement has properly cured, whether there are voids or channels within the cement, or whether there is cement behind the casing at all.

In general, cement bonding measurements provide an indication of the cement placement behind the wellbore casing for determining whether there is a fluid seal of the casing. Having a fluid seal of the wellbore serves to protect the wellbore from fluids that may flow between portions of the wellbore. Also, another function of having an adequate cement bond is to provide mechanical support for the wellbore. Because the wellbore may be used as a means for conveying valves, packers, pumps, etc., the wall of the casing may become thinned. Therefore having adequate cement bonding is important for both providing structural support for the wellbore as well as for providing a necessary fluid seal.

Acoustic methods have been used in the industry for measuring the cementing conditions in a wellbore. These methods involve measuring the responses of acoustic signal reflection from the wellbore casing. By analyzing the acoustic signal responses from the wellbore casing, many cementing conditions have been determined such as cement compressive strength, the thickness of the wellbore casing, and even defects or the amount of corrosion that may exist within the inner surface of the wellbore casing itself.

Examples of methods and apparatuses for measuring acoustic signals for determining cementing conditions within a wellbore are disclosed in U.S. Pat. App. 2006/0067162, by Blankinship et al., entitled "Ultrasonic Cement Scanner" and U.S. Pat. No. 5,377,160, by Tello et al., entitled "Transmitter and Receiver to Radially Scan the Cementing Conditions in Cased Wells," which are both incorporated herein.

Many of these methods and apparatuses for measuring acoustic signals use a combination of sector cement bond logging (CBL) transmitters with receivers and monopole CBL transmitters having corresponding monopole CBL receivers. These CBL transmitters are typically used in a wellbore to transmit acoustic signals into the wellbore fluid and to the wellbore casing, the reflection thereof received by a corresponding CBL receiver and analyzed to determine the cementing conditions of the wellbore casing.

However, each combination of sector cement bond logging (CBL) transmitters with receivers and monopole CBL transmitters with corresponding monopole CBL receivers have corresponding strengths and weaknesses. For example, where transmitting acoustic signals between monopole CBL transmitters and monopole CBL receivers may illustrate the amount cement has bonded all the way around the wellbore casing, (i.e., how well the cement is bonded around the inside of the casing as a whole), they cannot illustrate how the cement has bonded to any particular section of the pipe. In contrast, the acoustic signals measured between sector transmitters and sector receivers illustrate a picture of the individual channels (i.e., individual sectors or sections of the wellbore casing).

FIG. 1A illustrates a wellbore log 100 of a wellbore for presenting cement bonding data according to the prior art. The first column 106 depicts standard cement bond logging information for a monopole receiver displaced 3 feet from a monopole transmitter in a wellbore. The second column 107 depicts the cement bonding information for sector receivers displaced 2 feet from the sector transmitters, while the fourth column 109 depicts a standard Variable Density Log (V.D.L.) presentation for the monopole receiver displaced 5 feet from a monopole transmitter. Further, the third column 108 shows a depiction of the variable amplitudes within a circumferential placement of cement about the exterior circumference of the casing, with darker shading showing a measurement of higher compressive strength for the cement. As shown, by knowing the data obtained from sector receivers displaced 2 feet from the sector transmitters it is possible to identify the circumferential qualities of the wellbore casing at given pressures at specific sections of the casing.

Therefore, by measuring and analyzing the individual sectors of the wellbore it is possible to determine if there is good bonding everywhere except for an individual channel or sector (e.g., instead of potentially making the assumption that there exists a bad cement job throughout the outer circumference of the casing). That is, although it is possible to measure the overall poor compressive strength of the wellbore as a whole at a certain depth using monopole CBL data, with sector CBL data it is possible for example to identify whether there actually exists good cementing conditions around the majority of the wellbore casing, except that the wellbore casing is leaning against a rock formation and the cement was unable to bond to a particular sector. As a result, sector CBL acoustic signal evaluation will tell you whether there exist poor compressive strength of the cement, or whether you have good compressive strength of the cement, but a poorly bonded channel.

However, one downfall of using sector CBL transmit to sector CBL receive is that, depending on the conditions downhole, acoustic signal measurements between sector CBL transmitters and sector CBL receivers are not as stable as similar measurements between monopole CBL transmitters and monopole CBL receivers. This is because the acoustic signal measurements between the sector CBL transmitters and sector CBL receivers are very sensitive to transmitter/receiver matching, and more, to changes in pressure and temperature downhole. Because the pressure and temperatures downhole will typically vary greatly, the acoustic signal amplitudes measured at the sector CBL receivers may suffer a substantial drift in amplitude, making the resulting data unstable and unreliable.

As a result, not only does the adequacy of the cementing conditions downhole affect the amplitudes measured at the sector CBL receivers, but also temperature and pressure changes downhole. Therefore, by only analyzing the amplitude of the measured acoustic signals themselves it is impossible to determine whether amplitude variations are caused by the cementing conditions or the changes in temperature and pressure downhole.

Because of the above identified problems with acoustic signal measurements between sector CBL transmitters and sector CBL receivers, many operators have given up completely on using sector transmit to sector receive, either relying entirely on using monopole CBL transmitters and monopole CBL receivers or using a combination of a single monopole transmitter and sector receivers. Although, the above attempts to avoid the pressure/temperature sensitivities of sector CBL transmitter to sector CBL receiver are possible, transmitting an acoustic signal with a single monopole transmitter and receiving the acoustic signal using sector receivers severely sacrifices the radial sensitivity attained by transmitting with sector transmitters and receiving with sector receivers (i.e., radial resolution around the pipe). Further, the spatial resolution of the sector receivers deteriorates as their distance from the transmitter increases.

It is therefore desirable to have a system and method that allows accurately measuring the cementing conditions downhole by correcting the instability and drift in amplitude of measured acoustic signals due to changes in pressure and temperature downhole, thereby preserving the radial sensitivity obtained by transmitting from sector CBL transmitters and receiving at sector CBL receivers.

The subject matter of the present disclosure is directed to overcoming, or at least reducing the effects of, one or more of the problems set forth above.

SUMMARY OF THE DISCLOSURE

A method and apparatus for normalizing an acoustic wellbore tool by correcting the amplitude drift between sector CBL transmitters and sector CBL receivers, due to changes in pressure and/or temperature in a wellbore, is disclosed. As pressure increases downhole, acoustic signal measurements between monopole CBL transmitters and receivers are relatively stable. However, amplitudes of acoustic signal measurements between sector CBL transmitters and sector CBL receivers vary substantially given changes in temperature and pressure downhole. By normalizing the aggregate of the sectors' amplitudes to a theoretical monopole amplitude given a common transmitter receiver displacement, the overall amplitude drift of the sectors may be made to drift only as much as the amplitude measurements between the monopole CBL transmitters and receivers; thereby stabilizing the overall amplitude drift of the measured signals at the sector CBL receivers.

The foregoing summary is not intended to summarize each potential embodiment or every aspect of the present disclosure.

DETAILED DESCRIPTION OF THE DISCLOSURE

Figure 1A:
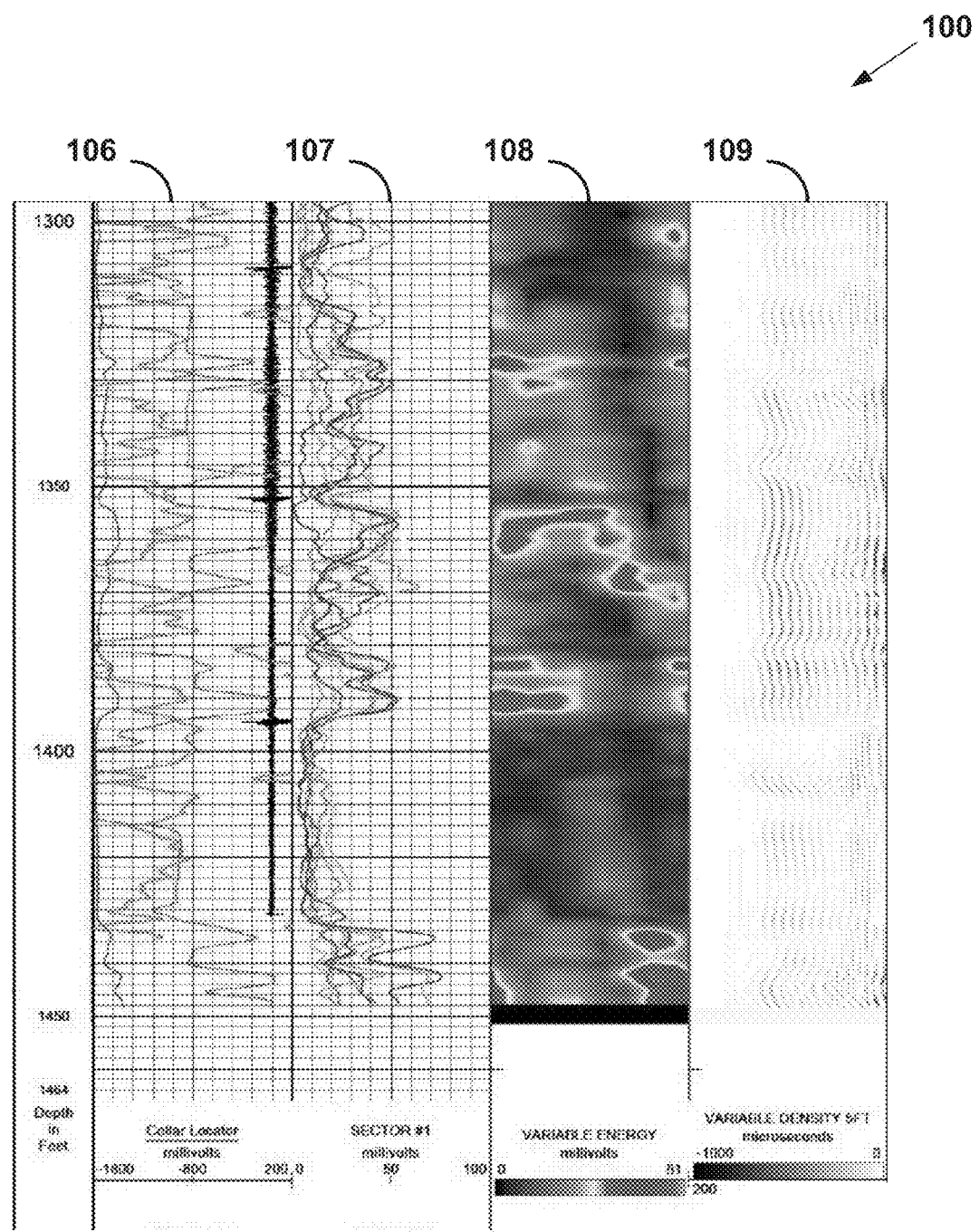
FIG. 1A illustrates a wellbore log of a wellbore according to the prior art.
Figure 1B:
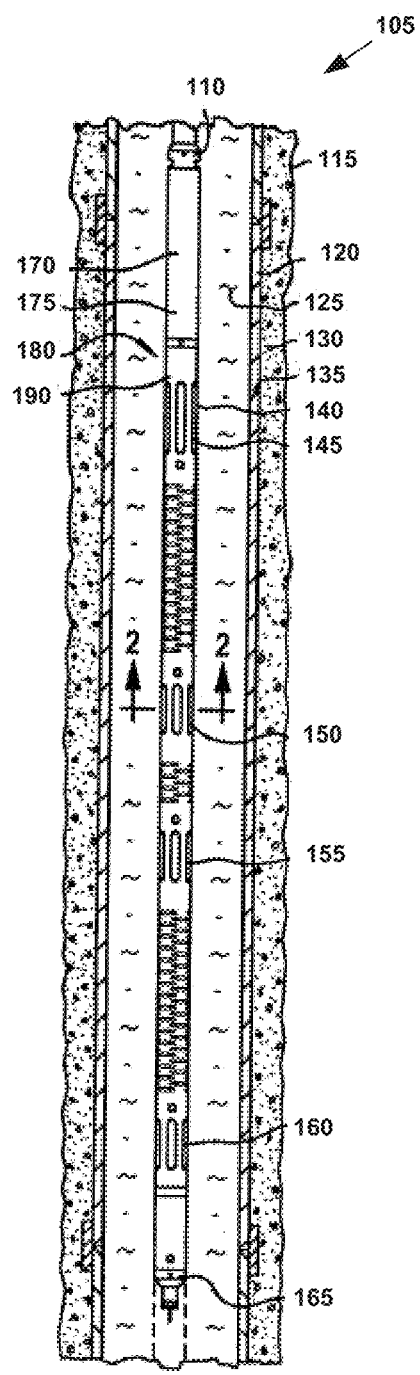
FIG. 1B illustrates a partial longitudinal section view of a wellbore having a casing string extending longitudinally within according to the present disclosure.

FIG. 1B illustrates a partial longitudinal section view of a wellbore 115 having a wellbore casing 120 extending longitudinally within according to the present disclosure. Wellbore casing 120 is tubular and may have casing grout 130 disposed in an annulus about the exterior of wellbore casing 120. Casing grout 130 can be cement or other bonding material that can be used to provide a sealing material for preventing communication of fluids between different formation in the annulus between the wellbore 115 and the wellbore casing 120. As shown, borehole fluid 125 is shown within the wellbore casing 120. Also, the acoustic well logging tool ("logging tool") 105 is shown disposed within the wellbore casing 120. The logging tool 105 includes a tool housing 170, within which an electronic section 175 and sonde section 190 are located.

The sonde section 190 includes transmitters and receivers which comprise a plurality of acoustic transducers. Also the electronic, sonde, and/or other section of the tool may include one or more processors and memory disposed which may be used to configure the tool to transmit and/or receive and process acoustic signals. The sonde section 190 includes at least one monopole transmitter 140, eight or more sector transmitters 145, eight sector receivers 150, a first monopole receiver 155, and a second monopole receiver 160. Sector transmitters 145 provide a first portion of the acoustic transducers for transmitting an acoustic signal to the wellbore casing 120, and sector receivers 150 provide a second portion of the acoustic transducers for receiving the transmitted acoustic signals and emitting a plurality of electric signals from which a circumferential placement and bonding of cement longitudinally along the wellbore casing 120 may be radially determined.

The monopole transmitter 140, first monopole receiver 155, and second monopole receiver 160 provide a plurality of acoustic transducers for measuring the amplitude of acoustic signals and for providing a variable density log (V.D.L.) display for a standard cement bond log. A first monopole receiver 155 is displaced 3 feet away from the monopole transmitter 140 for measuring the cement bonding average amplitude. A second monopole receiver 160 is displaced 5 feet away from the monopole transmitter 140 for providing the variable density log (V.D.L.) display (See FIG. 1A).

In one embodiment of the present disclosure, the monopole transmitter 140 transmits an acoustic signal having a frequency substantially measuring 30 kHz, and first monopole receiver 155 and second monopole receiver 160 are provided to receive the 30 kHz acoustic signal transmitted by the monopole transmitter 140. Additionally, the tool housing 170 includes an upper connector 110 for connecting the logging tool 105 to a wireline cable, such as, for example, a high pressure wireline cable having only one insulated conductor. The tool housing 170 further includes a lower connector 165 for either connecting to a bullnose, or for connecting the logging tool 105 to other downhole well logging tools within a tool string in which the logging tool 105 is included.

Figure 2A:
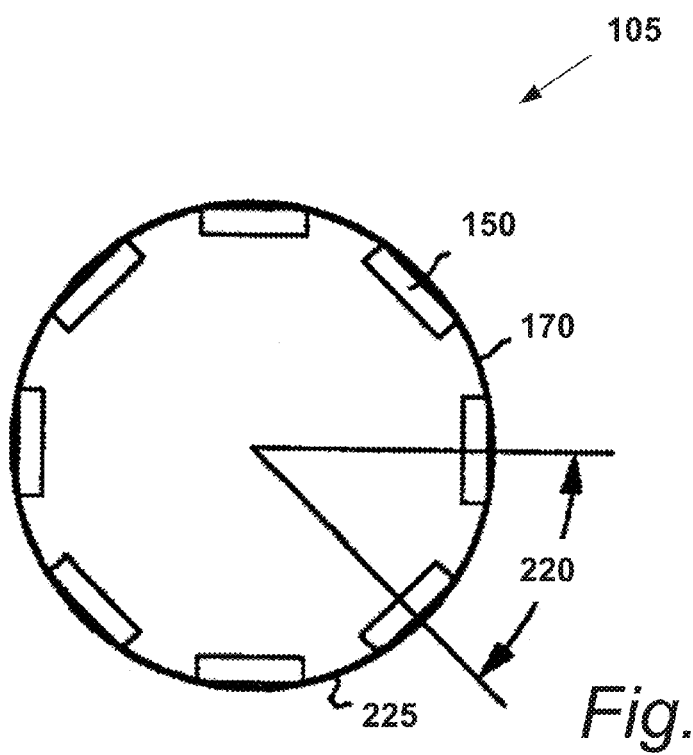
FIG. 2A illustrates a cross sectional diagram showing the physical placement of sector receivers disposed within the acoustic well logging tool according to the present disclosure.

FIG. 2A illustrates a cross sectional diagram showing the physical placement of the sector receivers 150 disposed within the acoustic well logging tool 105 according to the present disclosure. Referring to the illustration, the diagram schematically represents the placement of sector receivers 150 disposed angularly about the tool housing 170. In one embodiment, there are eight sector receivers 150 angularly spaced about the housing circumference 225 of tool housing 170, being separated by a spacing angle 220. It should also be noted that sector transmitters 145 are angularly spaced around the tool housing 170 for transmitting acoustic signals to be received by the sector receivers 150.

Figure 2B:
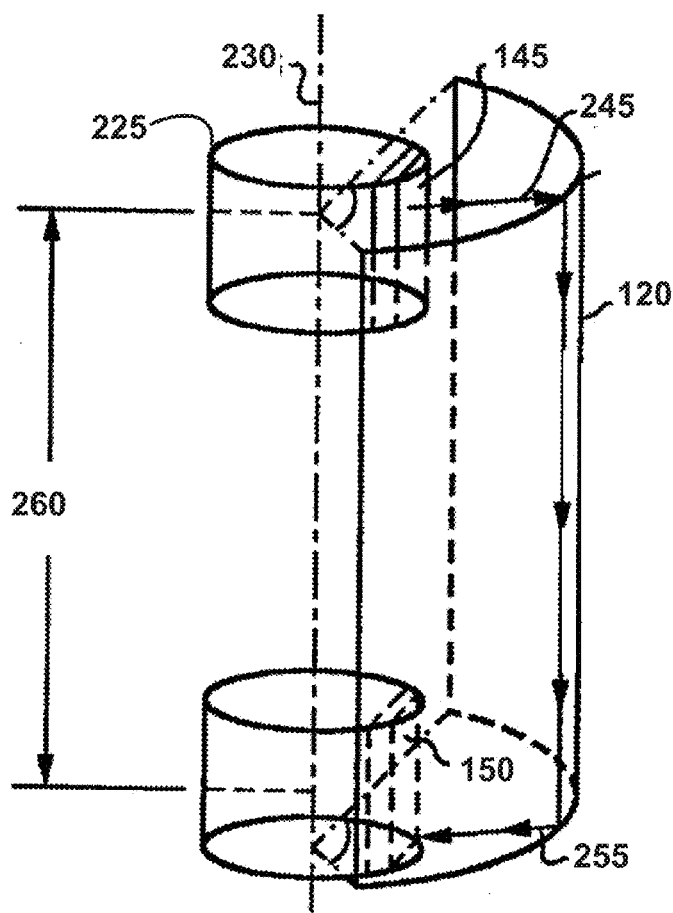
FIG. 2B illustrates a schematic representation of the longitudinal displacement of sector transmitters and sector receivers according to the present disclosure.

FIG. 2B illustrates a schematic representation of the longitudinal displacement of sector transmitters 145 and sector receivers 150 according to the present disclosure. As shown, the schematic diagram depicts the spacing between a sector transmitter 145 and a sector receiver 150 for transmitting an acoustic signal longitudinally along the wellbore casing 120. The sector transmitter 145 emits an acoustic signal which follows an upper acoustic pathway 245 in traveling from sector transmitter 145 to sector receiver 150.

The emitted acoustic signal first travels through the upper acoustic pathway 245 to the wellbore casing 120, then along the lower acoustic pathway 255 in a direction which extends parallel to a longitudinal axis of the wellbore casing 120, and then back through borehole fluid 125 to sector receiver 150. When the acoustic signal travels through acoustic pathways 245 and 255, it travels in a longitudinally extending direction along the acoustic pathway, which extends parallel to a longitudinal distance. The sector acoustic transmitter 145 is distally spaced a longitudinal distance, which substantially measures 2 feet according to an embodiment of the present disclosure. Also, while not illustrated in FIG. 2B, the monopole acoustic transmitter 140 is likewise spaced a longitudinal distance of 3 feet from the first monopole receiver 155, and a longitudinal distance of 5 feet from the second monopole receiver 160 (see FIG. 1). As appreciated however, this embodiment describes one illustration of the transmitter/receiver spacing, and that the transmitters/receivers may have different spacing combinations within the wellbore 115.

Acoustic signal frequencies ranging substantially between 90 and 130 kHz have been determined to provide an optimal acoustic signal which may be passed longitudinally through a well casing 120, such as wellbore casing 120, to provide a radial indication of the circumferential placement of a cement sealing material longitudinally along the exterior of the wellbore casing 120. In one embodiment of the present invention, a 100 kHz signal is used. Additionally, the 2-foot sector transmitter 145 to sector receiver 150 spacing has been determined to provide optimal performance for radially measuring the attenuation of an acoustic signal having a frequency ranging substantially between 90 and 130 kHz which passes longitudinally along the wellbore casing 120.

Figure 3A:
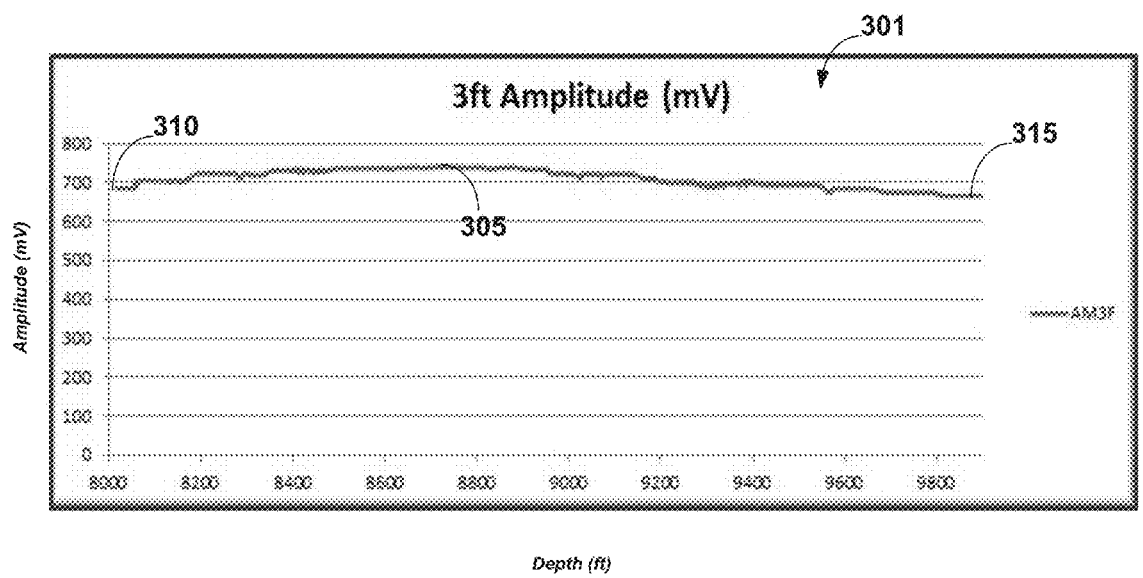
FIG. 3A illustrates a graphical representation of measured acoustic signal amplitudes using a monopole receiver displaced 3 feet from a monopole transmitter over changes in pressure according to the present disclosure.

FIG. 3A illustrates a graphical representation of measured acoustic signal amplitudes 301 using a monopole receiver 155 displaced 3 feet from a monopole transmitter 140 over changes in depth and pressure according to the present disclosure. As shown, the representation illustrates measured acoustic amplitudes received at the monopole receiver 155 displaced 3 feet (first monopole receiver) as they relate to changes in the wellbore depth and pressure. The measured acoustic amplitudes 301 can be obtained by using a test well, which can be used to emulate a wellbore 115 downhole, and by example may be used to vary the pressure and or temperature downhole. In this illustration, however, the peak amplitude 305 measured at the first monopole receiver 155 is around 740 mV. The amplitude measured at this point is substantially greater than amplitudes measured at any other pressure.

As shown in FIG. 3A, the first measured minimum amplitude value 310 and second measured minimum amplitude value 315 does not vary significantly given the change in pressure. The first measured minimum amplitude in this illustration is around 690 mV while the second measured minimum amplitude value (measured at a substantially higher pressure) is around 650 mV.

Considering however, the drift in amplitudes for the measured acoustic signal amplitudes using the monopole receiver displaced 3 feet from the monopole transmitter 140, in comparison with measured amplitudes at sector receivers 150 displaced 2 feet from sector transmitters 145, it is clear that the drift in amplitudes for the sector receivers 150 is more substantial.

Figure 3B:
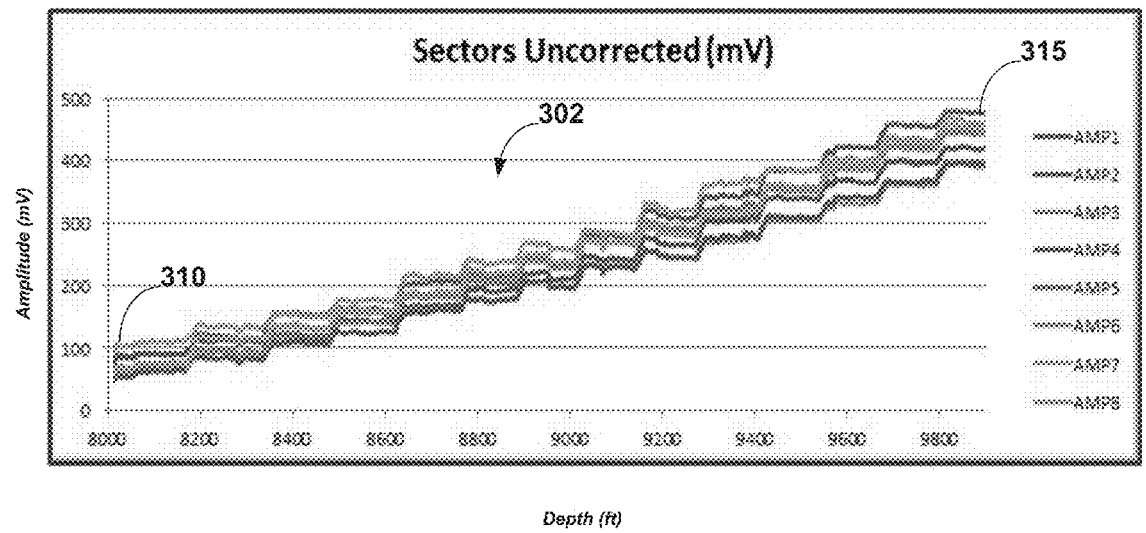
FIG. 3B illustrates a graphical representation of measured amplitudes at sector receivers displaced 2 feet from sector transmitters over changes in pressure according to the present disclosure.

Referring now to FIG. 3B, a graphical representation of measured amplitudes at sector receivers 150 displaced 2 feet from sector transmitters 145 over changes in pressure 302 according to the present disclosure is illustrated. As shown, the first measured minimum amplitude values 310 and a second measured minimum amplitude values 315 change more significantly than that of the measured amplitudes when using the monopole receiver displaced 3 feet from the monopole transmitter 140 (as illustrated in FIG. 3A). Again, although the exact voltages are not shown in the representation, the first measured minimum amplitudes are around 50-100 mV while the second measured minimum amplitude values are between 380-500 mV. Therefore, as illustrated, the measured acoustic signal amplitudes using the sector receivers 150 displaced 2 feet from the sector transmitters 145, may record a substantial drift in the test well.

Therefore, it is clear that the measured drift in amplitudes based on pressure changes downhole for sector transmitters 145 to sector receivers 150 having a 2 foot displacement is more substantial than that of the monopole transmitter 140 to monopole receiver 155 displaced by 3 foot. Accordingly, knowing this information, the more stable monopole amplitude "drift" rate at a 3 foot displacement may be used as a baseline for normalizing the amplitude drift of the measured sector amplitudes having a 2 foot displacement.

Because the amplitude drift of the measured acoustic signals between monopole transmitters 140 and receivers 155 are relatively stable in comparison to amplitude drifts of the measured acoustic signals between sector transmitters 145 and receivers 150, if the aggregate of the sectors' amplitudes displaced 2 feet were normalized to the monopole's amplitudes displaced 3 feet, then the overall drift of the sectors' amplitudes would drift only as much as the monopole measured signals.

Figure 4:
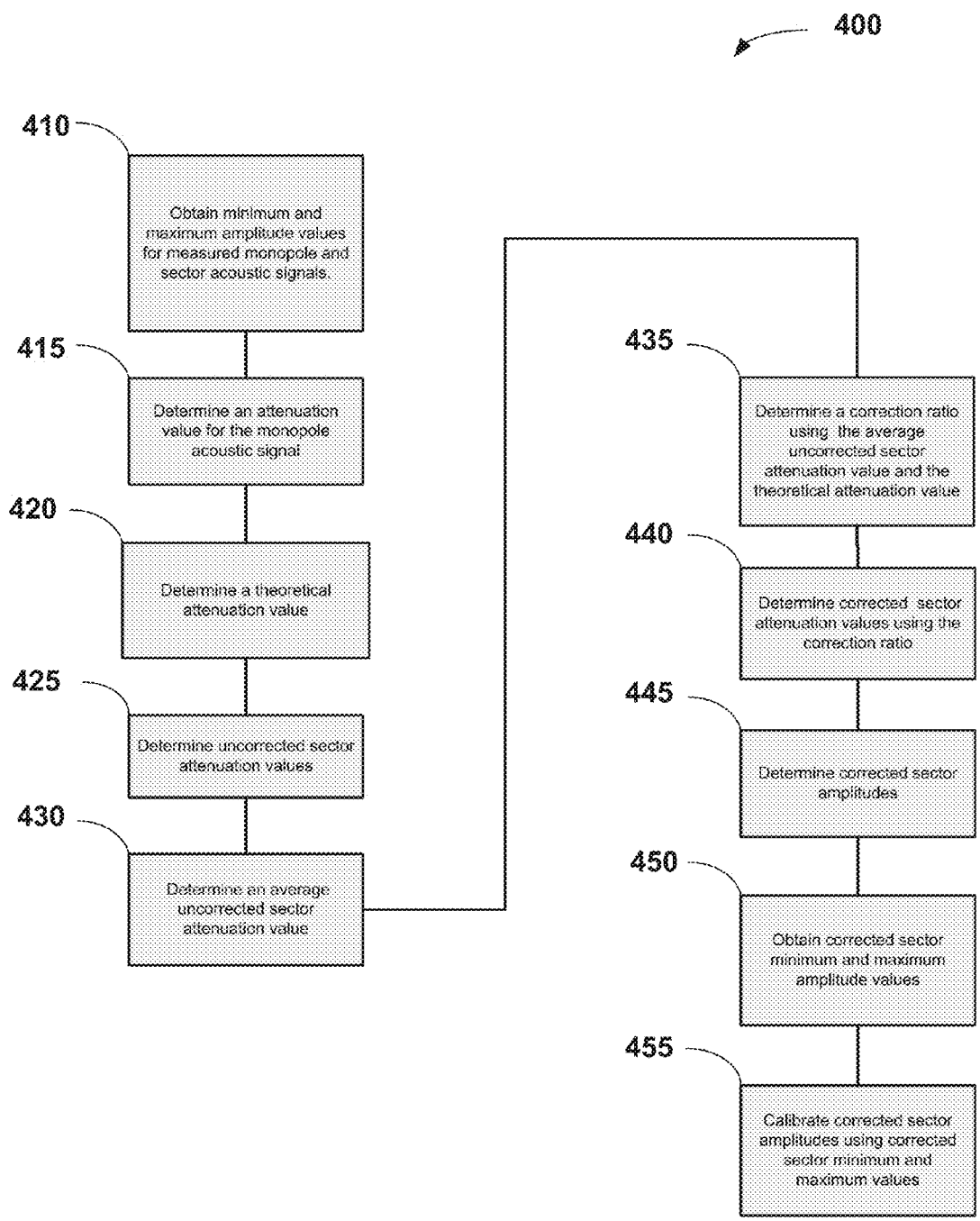
FIG. 4 illustrates an exemplary method for correcting drifts in amplitude for acoustic signals measured at sector receivers displaced 2 feet from sector transmitters.

FIG. 4 illustrates an exemplary method for correcting drifts in amplitude for the acoustic signals measured at the sector receivers 150 displaced 2 feet from the sector transmitters 145. A first step 410 in correcting the drifts in amplitude for the sectors may involve determining the minimum and maximum amplitude values for the measured data between the monopole transmitter 140 and receiver 155 and between the sector transmitters 145 and sector receivers 150. These values initially illustrate the high and low values for free pipe and well bonded pipe, wherein free pipe is the area of the wellbore casing 120 having the lowest compressive strength, and well bonded pipe is the area where the wellbore casing 120 has the highest compressive strength. The area of the wellbore casing 120 that has the lowest amount of compressive strength is represented with the highest measured amplitude of the acoustic signals, (e.g., at the peak amplitude). In contrast, the area of the wellbore 115 that is the most bonded is represented when the acoustic signal is at its lowest measured amplitude.

Referring now to step 415 in the process, this step involves determining attenuation values using the measured acoustic signal amplitudes of the monopole receiver displaced 3 feet from the monopole transmitter 140 (hereinafter "monopole acoustic signal") and the measured acoustic signal amplitudes of the sector receivers 150 displaced 2 feet from the sector transmitters 145 (hereinafter "sector acoustic signals"). As will be described in more detail below, the attenuation value of the monopole acoustic signal may be used to calculate a correction ratio to be used to correct the drift in amplitude of the sector acoustic signals.

By knowing the attenuation value of the monopole acoustic signal, given a specific measured pressure amount at 3 foot, it is possible to calculate a theoretical monopole attenuation value at that pressure disposed 2 foot from the transmitter. This data may be used for normalizing the sector acoustic signals to that of the monopole acoustic signal, thereby normalizing or correcting the drift in amplitude of the sector acoustic signals due to changes in pressure and temperature downhole.

The equation for obtaining the attenuation value for the monopole acoustic signal is below:

$$\text{Monopole } Attn \text{ Value} = (K)(20)\text{Log}_{10}\left(\frac{\text{Raw } Amp}{\text{Max } Amp}\right)$$

As shown in the above equation, the Raw Amp is a measured amplitude value of the monopole acoustic signal (acoustic signal amplitude) for a given pressure at some depth as illustrated in FIG. 3A. Further, per the equation, the Max Amp is the overall maximum measured amplitude value (i.e., peak value) for the given set of data (e.g., for the monopole acoustic signal in FIG. 3A the value is 740 mV. Also, K is a constant determined as a function of transmitter-receiver spacing and operating frequency. In this illustration however K may be close to ⅓ representing a monopole acoustic signal measured having a 3 foot displacement between the transmitter 140 and receiver 155 as described above.

Because the sector acoustic signals are only measured while being displaced 2 feet from the sector transmitters 145, the equation may be modified to represent the 2 foot displacement for the sectors is shown below:

$$\text{Sector } Attn \text{ Value}(n) = (K)(20)\text{Log}_{10}\left(\frac{\text{Raw } Amp(n)}{\text{Max } Amp(n)}\right)$$

Wherein in the illustration above, (n) comprises the one or more sector acoustic signals, Raw Amp (n) comprises the amplitude value of the (n)th sector acoustic signal at a given pressure, Max Amp comprises the overall maximum measured amplitude values of the one or more sector acoustic signals as the measured amplitude values of the one or more sector acoustic signals vary with changes in depth and pressure in the wellbore 115, and K is a constant determined as a function of transmitter-receiver spacing and operating frequency. In this illustration K may be close to ½, representing sector acoustic signals measured having a 2 foot displacement between transmitters 145 and receivers 150 as described above, and Sector Attn Value (n) comprises the attenuation value of the (n)th sector acoustic signal at the given pressure.

Figure 5A:
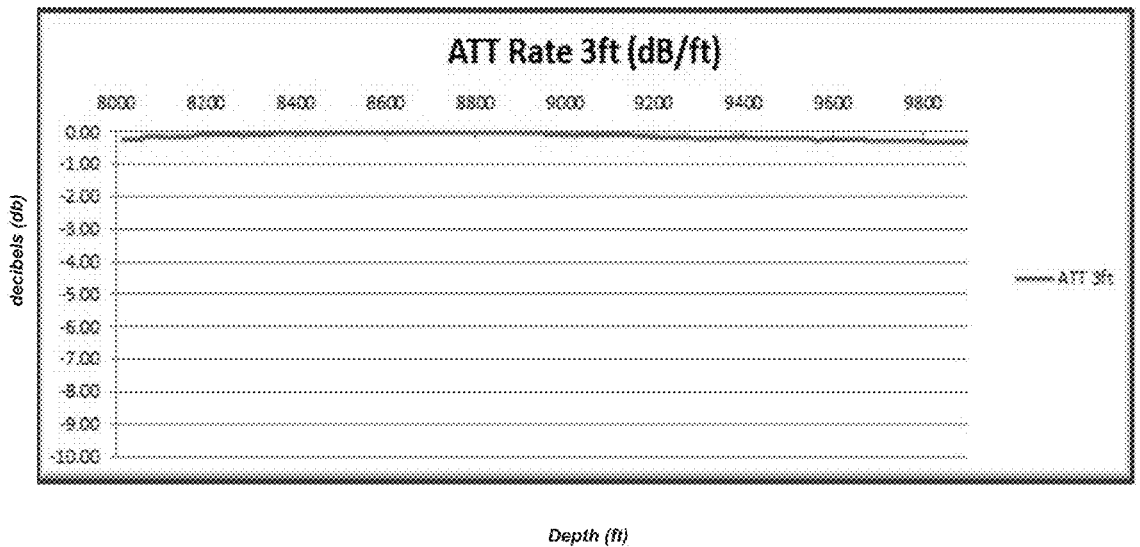
FIG. 5A illustrates a graphical representation of the calculated attenuation rate of the measured acoustic signal in FIG. 3A over changes in pressure according to the present disclosure.
Figure 5B:
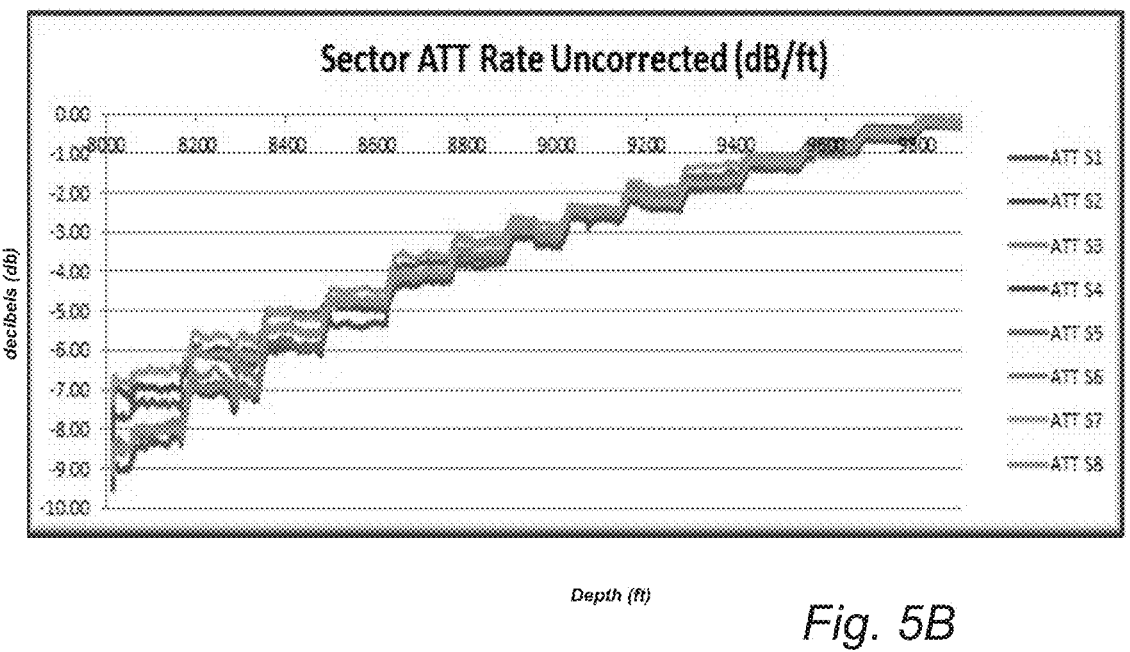
FIG. 5B illustrates a graphical representation of the calculated attenuation rates of the measured amplitudes at the sector receivers in FIG. 3B over changes in pressure according to the present disclosure.

FIG. 5A illustrates a graphical representation of the calculated attenuation rate of the measured monopole acoustic signal in FIG. 3A over changes in pressure at some depth according to the present disclosure. As shown, the computed attenuation values collectively show the rate or change of attenuation over changes in depth and pressure downhole for the monopole acoustic signal measured 3 foot from the monopole transmitter 140. In contrast, FIG. 5B illustrates a graphical representation of the calculated attenuation rates of the measured amplitudes at the sector receivers 150 in FIG. 3B over changes in depth and pressure according to the present disclosure.

In order to accurately normalize the sector acoustic signals to that of the monopole acoustic signal, the calculated attenuation rate for the monopole acoustic signal must have a factor common to that of the sector acoustic signals. Thus, referring to step 420, the attenuation rate of the monopole acoustic signal at 3 foot is used to determine a theoretical attenuation rate for the monopole acoustic signal at 2 foot for comparison with the sector acoustic signal at 2 foot. Computing the theoretical attenuation rate for the monopole acoustic signal at 2 foot can be determined using the equation:

$$\text{Theoretical Attn Value} = (K)(\text{Monopole Attn Value})$$

Figure 6:
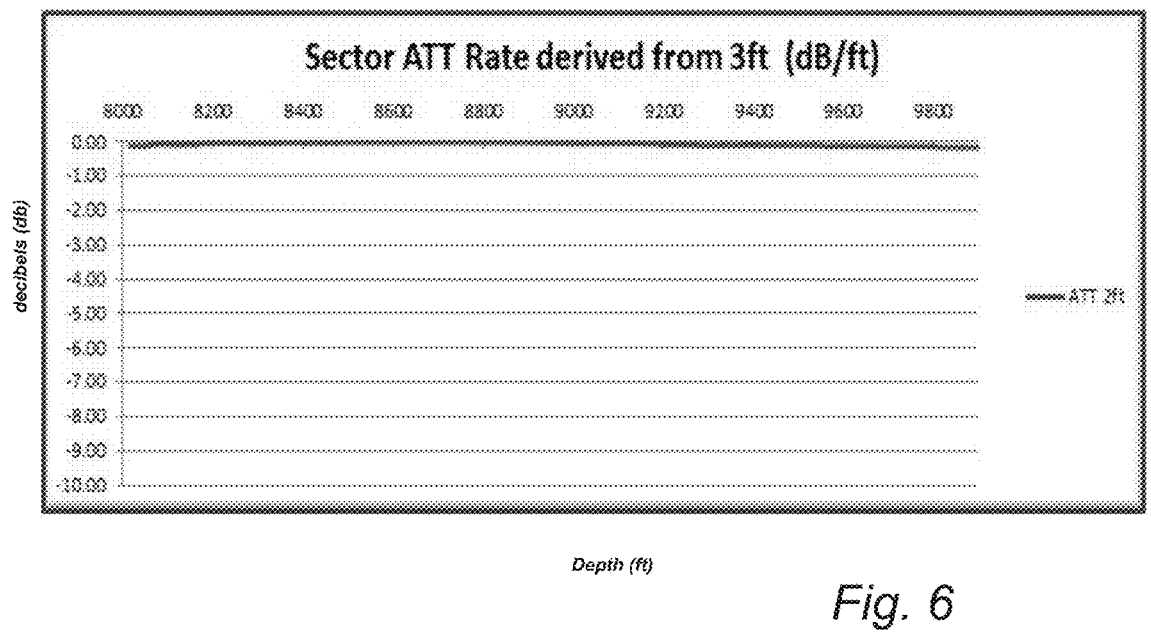
FIG. 6 illustrates a graphical representation of a theoretical attenuation rate at 2 feet for the calculated 3 feet attenuation rate of FIG. 3A.

As described above, the Monopole Attn Value comprises the attenuation value of the at least one monopole acoustic signal at a given pressure, and Theoretical Attn Value comprises the theoretical attenuation value for the monopole acoustic signal. K is a constant determined as a function of transmitter-receiver spacing and operating frequency. In this illustration however K may be close to ½, representing sector acoustic signals measured having a 2 foot displacement between transmitters and receivers as described above. Referring to FIG. 6 a graphical representation for the theoretical attenuation rate at 2 foot is illustrated. By knowing the theoretical attenuation rate for the monopole acoustic signal at 2 foot, a correction ratio may be determined.

However, in order to compare the monopole and sector acoustic signal attenuation values, the sector acoustic signal attenuation values are first determined and then averaged (see FIG. 4, steps 425, 430). Because the theoretical monopole acoustic signal is representative of cementing conditions axially around the wellbore casing 120 as a whole at a 2 foot displacement, the average attenuation rate of the sector acoustic signals having a 2 foot displacement is comparative—differing only in the amount the pressure changes downhole affect the rate of attenuation of the sector acoustic signals.

Referring now to step 435, once the average attenuation rate of the sector acoustic signals have been determined, a correction ratio may be determined. The correction ratio is the ratio of the theoretical attenuation rate of the monopole acoustic signal to that of the average attenuation rate of the sector acoustic signals. This ratio is illustrated below:

$$\text{Correction Ratio} = \left(\frac{\text{Theoretical Attn Value}}{\text{Avg Sector Attn}}\right)$$

Wherein the Theoretical Attn Value is the theoretical attenuation rate at 2 foot of the monopole acoustic signal, and the Avg Sector Attn is the average attenuation rate of the sector acoustic signals at 2 foot, as described above.

Figure 7:
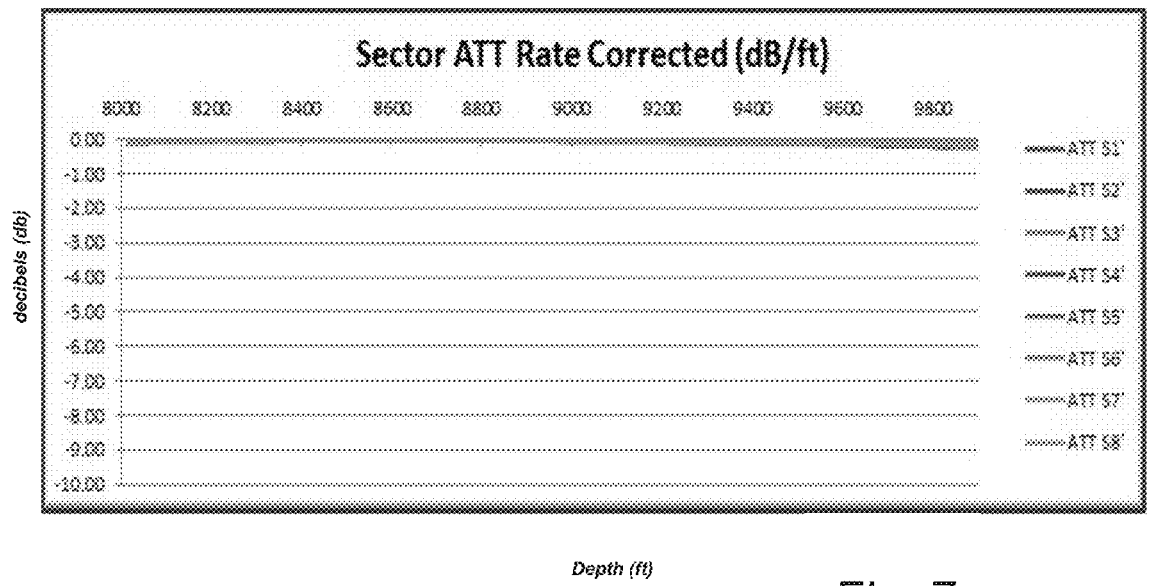
FIG. 7 illustrates a graphical representation of the corrected attenuation rates of the measured acoustic signals at the sector receivers displaced 2 feet from the sector transmitters over changes in pressure according to the present disclosure.

Referring now to the correction step 440 of FIG. 4, having determined the rate that the attenuation of the sectors vary from the attenuation of the monopole acoustic signals due to changes in pressure downhole, the attenuation rate of the sector acoustic signals may be normalized to the rate of attenuation experienced by the monopole acoustic signals (i.e., corrected). This correction process 440 is performed by multiplying the correction ratio by the calculated attenuation values of each of the sector acoustic signals originally determined in step 425, and illustrated in FIG. 3B. The correction equation can be better understood by referring to the below equation:

Corrected Attn Value (*n*)=Correction Ratio*Sector Attn Value (*n*)

Wherein in the illustration above, (n) comprises the one or more sector acoustic signals, Corrected Attn Value comprises the corrected attenuation values of the one or more sector acoustic signals, and Sector Attn Value (n) comprises the attenuation value of the (n)th sector acoustic signal at the given pressure. FIG. 7 illustrates a graphical representation of the corrected attenuation values of the measured acoustic signals at the sector receivers 150 displaced 2 feet from the sector transmitters 145 over changes in pressure according to the present disclosure.

Referring back to the exemplary method of FIG. 4, and paying particular attention to step 445, after having corrected the attenuation values of the sector acoustic signals, the next step is to convert the attenuation values of the corrected sector acoustic signals back to their original measures of amplitude. By reverting back to amplitude, corrected drifts in amplitude for the signals can be seen. The below equation is used to convert the corrected attenuation values for the sector acoustic signals into amplitude:

$$\text{Correction Sector } Amp(n) = 10^{\wedge\left(\frac{\text{Corrected Attn Value}(n)}{10}\right)} * \text{Max}Amp(n)$$

Wherein the (n) comprises the one or more sector acoustic signals, Corrected Attn Value comprises the corrected attenuation values of the one or more sector acoustic signals, and Max Amp comprises the overall maximum measured amplitude values of the one or more sector acoustic signals as the measured amplitude values of the one or more sector acoustic signals vary with changes in depth and pressure in the wellbore 115.

Figure 8:
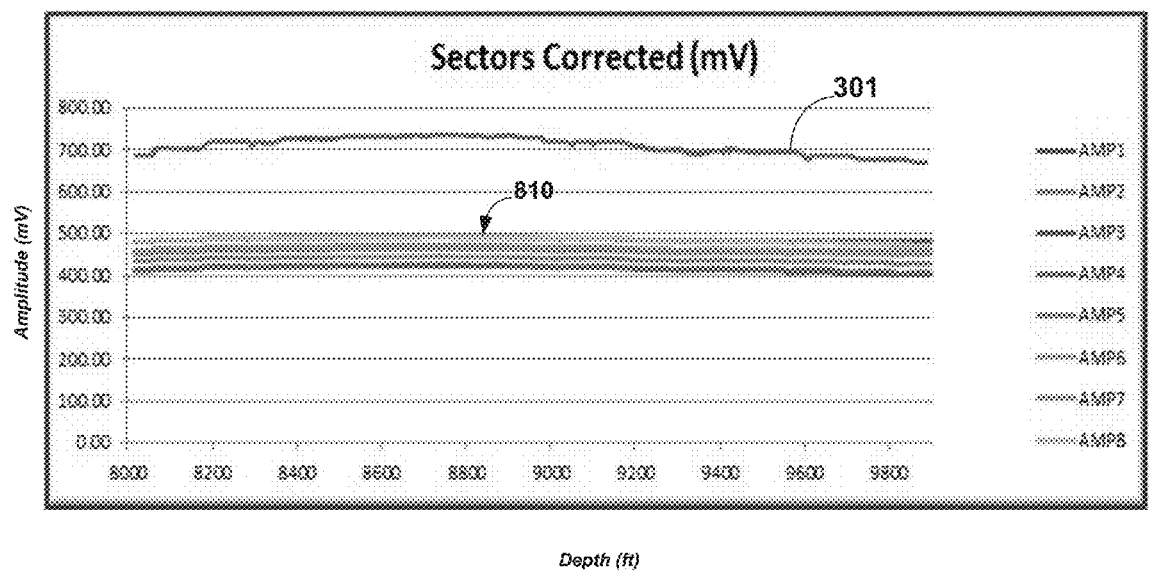
FIG. 8 illustrates a graphical representation of the corrected amplitudes of the measured acoustic signals at the sector receivers displaced 2 feet from the sector transmitters over changes in pressure according to the present disclosure.

Referring now to FIG. 8, a graphical representation of the corrected amplitudes for the sectors displaced 2 feet (i.e., the sector acoustic signals) from the sector transmitters 145 over changes in pressure at some depth according to the present disclosure is shown. As illustrated, the drift of the acoustic signals has been significantly reduced. By comparing the corrected sector acoustic signal amplitude values 810 in FIG. 8 to the uncorrected measured signal amplitude values 302 in FIG. 3B, It can be determined that not only has the drift or variance in amplitudes been normalized to that of the drift in amplitude for the monopole measured amplitude value 301, but the corrected values 810 are more stable. Thus, the effect that pressure changes downhole have in substantially affecting the acoustic signals measured by the sector receivers 150 are substantially reduced by normalizing the sector acoustic signal amplitudes to the more stable monopole acoustic signal amplitude.

After the drift associated with the sector acoustic signals has been corrected and the attenuation values have been converted back to amplitude, the corrected amplitude values 810 for the sectors are calibrated to correct the low end and high end trace values so that they are accurately represented for a given wellbore casing 120 size and casing grout 130 compressive strength. That is, the minimum and maximum values for the corrected sector acoustic signals 810 need to be driven to known (i.e., published) minimum and maximum amplitude values for the particular size and weight of the wellbore casing 120 and casing grout 130 properties used downhole.

For example, given the above described corrected sector acoustic signals 810, the wellbore casing 120 and casing grout 130 will return initial calibration values having a minimum amplitude of and a maximum amplitude value representing a complete cement bond and an area of free pipe, respectively. Therefore, the corrected sector acoustic signal amplitudes 810 are calibrated with respect to these known parameters. The parameters may vary depending on the properties of the wellbore casing 120 and/or casing grout 130 used.

Figure 9:
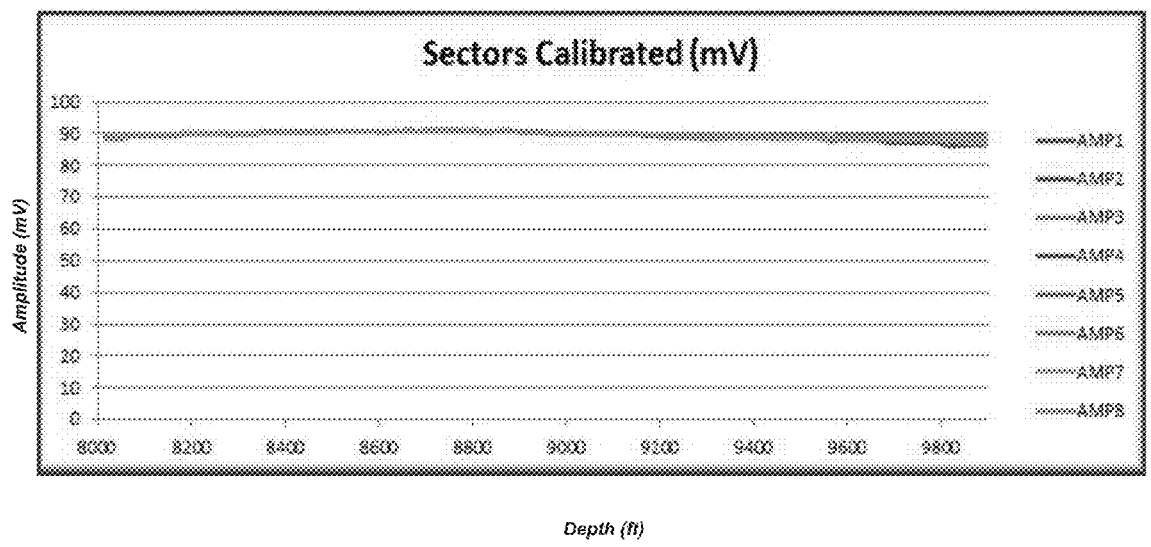
FIG. 9 illustrates a graphical representation of the calibrated corrected amplitudes of the measured acoustic signals at the sector receivers displaced 2 feet from the sector transmitters over changes in pressure according to the present disclosure.

An illustration of how the minimum values are reflected after being calibrated based on known wellbore low and high values may is shown by referring to FIG. 9. In this illustration, a graphical representation of the corrected amplitudes of the measured acoustic signals having been calibrated is shown according to the present disclosure. As shown, the minimum values of the sector acoustic signal have been corrected, and represent more accurate values with respect to the known parameters of the wellbore 115.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method for normalizing signals of an acoustic wellbore tool having at least one monopole transmitter and at least one monopole receiver disposed along a longitudinal axis of the tool and having one or more sector transmitters and one or more sector receivers disposed along the longitudinal axis of the tool, the method comprising:
firing the at least one monopole transmitter and recording at least one monopole acoustic signal received at the at least one monopole receiver;
determining at least one theoretical attenuation value of the at least one monopole acoustic signal;
firing the one or more sector transmitters and recording one or more sector acoustic signals received at the one or more sector receivers;
determining one or more sector attenuation values of the one or more sector acoustic signals;
determining a sector correction ratio using an average of the one or more sector attenuation values and using the at least one theoretical attenuation value; and
applying the sector correction ratio to the one or more sector acoustic signals to determine corrected amplitude values of the one or more sector acoustic signals.

2. The method of claim 1, wherein the at least one theoretical attenuation value represents the attenuation value of the at least one monopole acoustic signal received by the at least one monopole receiver having a longitudinal displacement from the at least one monopole transmitter equal to the longitudinal displacement of the one or more sector receivers from the respective one or more sector transmitters.

3. The method of claim 1, wherein the at least one theoretical attenuation value of the at least one monopole acoustic signal is determined using the equation:

$$\text{Monopole } Attn \text{ Value} = (K)(20)\text{Log}_{10}\left(\frac{\text{Raw } Amp}{\text{Max } Amp}\right)$$

where
Raw Amp is the amplitude value of the at least one monopole acoustic signal,
K is a constant determined as a function of transmitter-receiver spacing and operating frequency,
Max Amp is the overall maximum measured amplitude value of the monopole acoustic signal as the measured monopole acoustic signal amplitude values vary with changes in pressure in the wellbore, and
Monopole Attn Value is the attenuation value of the at least one monopole acoustic signal.

4. The method of claim 1, wherein the one or more sector attenuation values of the one or more sector acoustic signals are determined using the equation:

$$\text{Sector } Attn \text{ Value}(n) = (K)(20)\text{Log}_{10}\left(\frac{\text{Raw } Amp(n)}{\text{Max } Amp(n)}\right)$$

where
(n) comprises the one or more sector acoustic signals,
K is a constant determined as a function of transmitter-receiver spacing and operating frequency,
Raw Amp (n) comprises the amplitude value of the (n)th sector acoustic signal,
Max Amp (n) comprises the overall maximum measured amplitude value of the (n)th sector acoustic signal as the measured amplitude value of the (n)th sector acoustic signal varies with changes in pressure in the wellbore, and
Sector Attn Value (n) comprises the attenuation value of the (n)th sector acoustic signal.

5. The method of claim 1, wherein the at least one theoretical attenuation value of the at least one monopole acoustic signal is determined using the equation:

Theoretical Attn Value=(K)(Monopole Attn Value)

where
Monopole Attn Value comprises the attenuation value of the at least one monopole acoustic signal,
K is a constant determined as a function of transmitter-receiver spacing and operating frequency, and
Theoretical Attn Value comprises the theoretical attenuation value for the at least one monopole acoustic signal.

6. The method of claim 1, wherein the correction ratio is determined using the equation:

$$\text{Correction Ratio} = \left(\frac{\text{Theoretical } Attn \text{ Value}}{Avg \text{ Sector } Attn}\right)$$

where
Correction Ratio comprises the correction ratio,
Theoretical Attn Value comprises the theoretical attenuation value of the at least one monopole acoustic signal, and
Avg Sector Attn is the average sector attenuation value of the one or more sector attenuation values for the one or more sector acoustic signals.

7. The method of claim 6, wherein the Avg Sector Attn is determined by adding the one or more sector attenuation values of the one or more sector acoustic signals and dividing the sum by the number of the one or more sector acoustic signals.

8. The method of claim 1, wherein to determine the corrected amplitude values of the one or more sector acoustic signals, the method comprises determining corrected attenuation values of the one or more sector acoustic signals by the equation:

Corrected Attn Value (n)=Correction Ratio*Sector Attn Value (n)

where
(n) comprises the one or more sector acoustic signals,
Corrected Attn Value (n) comprises the corrected attenuation value of the (n)th sector acoustic signal, and
Sector Attn Value (n) comprises the sector attenuation value of the (n)th sector acoustic signal.

9. The method of claim 1, wherein the longitudinal displacement between the at least one monopole transmitter and the at least one monopole receiver is greater than the longitudinal displacement between the one or more sector transmitters and the respective one or more sector receivers.

10. The method of claim 1, wherein determining the corrected amplitude values of the one or more sector acoustic signals using the corrected attenuation values of the one or more sector acoustic signals is determined by the equation:

$$\text{Correction Sector } Amp(n) = 10^{\wedge\left(\frac{\text{Corrected } Attn \text{ Value}(n)}{10}\right)} * \text{Max}Amp(n)$$

where
(n) comprises the one or more sector acoustic signals,
Corrected Attn Value (n) comprises the corrected attenuation value of the (n)th sector acoustic signal, and
Max Amp (n) comprises the overall maximum measured amplitude value of the (n)th sector acoustic signal as the measured amplitude value of the (n)th sector acoustic signal varies with changes in pressure in the wellbore.

11. A logging tool, comprising:
at least one monopole transmitter and at least one monopole receiver disposed along a longitudinal axis of the logging tool;
one or more sector transmitters and one or more sector receivers disposed along the longitudinal axis of the logging tool;
at least one processor communicatively coupled to the at least one monopole transmitter, the at least one monopole receiver, the one or more sector transmitters and the one or more sector receivers;
memory communicatively coupled to the at least one processor and storing instructions thereon to cause the one or more processors to:
fire the at least one monopole transmitter and record at least one monopole acoustic signal received at the at least one monopole receiver;
determine at least one theoretical attenuation value of the at least one monopole acoustic signal;
fire the one or more sector transmitters and record one or more sector acoustic signals received at the one or more sector receivers;
determine one or more sector attenuation values of the one or more sector acoustic signals;
determine a sector correction ratio using an average of the one or more sector attenuation values and using the at least one theoretical attenuation value; and
apply the sector correction ratio to the one or more sector acoustic signals to determine corrected amplitude values of the one or more sector acoustic signals.

12. The logging tool of claim 11, wherein the at least one theoretical attenuation value represents the attenuation value of the at least one monopole acoustic signal received by the at least one monopole receiver having a longitudinal displacement from the at least one monopole transmitter equal to the longitudinal displacement of the one or more sector receivers from the respective one or more sector transmitters.

13. The logging tool of claim 11, wherein the at least one theoretical attenuation value of the at least one monopole acoustic signal is determined using the equation:

$$\text{Monopole } Attn \text{ Value} = (K)(20)\text{Log}_{10}\left(\frac{\text{Raw } Amp}{\text{Max } Amp}\right)$$

where
Raw Amp is the amplitude value of the at least one monopole acoustic signal,
K is a constant determined as a function of transmitter-receiver spacing and operating frequency,
Max Amp is the overall maximum measured amplitude value of the monopole acoustic signal as the measured monopole acoustic signal amplitude values vary with changes in pressure in the wellbore, and
Monopole Attn Value is the attenuation value of the at least one monopole acoustic signal.

14. The logging tool of claim 11, wherein the one or more sector attenuation values of the one or more sector acoustic signals are determined using the equation:

$$\text{Sector } Attn \text{ Value}(n) = (K)(20)\text{Log}_{10}\left(\frac{\text{Raw } Amp(n)}{\text{Max } Amp(n)}\right)$$

where
(n) comprises the one or more sector acoustic signals,
K is a constant determined as a function of transmitter-receiver spacing and operating frequency,
Raw Amp (n) comprises the amplitude value of the (n)th sector acoustic signal,
Max Amp (n) comprises the overall maximum measured amplitude value of the (n)th sector acoustic signal as the measured amplitude value of the (n)th sector acoustic signal varies with changes in pressure in the wellbore, and
Sector Attn Value (n) comprises the attenuation value of the (n)th sector acoustic signal.

15. The logging tool of claim 11, wherein the at least one theoretical attenuation value of the at least one monopole acoustic signal is determined using the equation:

Theoretical Attn Value=(K)(Monopole Attn Value)

where
Monopole Attn Value comprises the attenuation value of the at least one monopole acoustic signal,
K is a constant determined as a function of transmitter-receiver spacing and operating frequency, and
Theoretical Attn Value comprises the theoretical attenuation value for the at least one monopole acoustic signal.

16. The logging tool of claim 11, wherein the correction ratio is determined using the equation:

$$\text{Correction Ratio} = \left(\frac{\text{Theoretical } Attn \text{ Value}}{\text{Avg Sector } Attn}\right)$$

where
Correction Ratio comprises the correction ratio,
Theoretical Attn Value comprises the theoretical attenuation value of the at least one monopole acoustic signal, and
Avg Sector Attn is the average sector attenuation value of the one or more sector attenuation values for the one or more sector acoustic signals.

17. The logging tool of claim 16, wherein the Avg Sector Attn is determined by adding the one or more sector attenuation values of the one or more sector acoustic signals and dividing the sum by the number of the one or more sector acoustic signals.

18. The logging tool of claim 11, wherein to determine the corrected amplitude values of the one or more sector acoustic signals, corrected attenuation values of the one or more sector acoustic signals are determined by the equation:

Corrected Attn Value (n)=Correction Ratio*Sector Attn Value (n)

where
(n) comprises the one or more sector acoustic signals,
Corrected Attn Value (n) comprises the corrected attenuation value of the (n)th sector acoustic signal, and Sector Attn Value (n) comprises the sector attenuation value of the (n)th sector acoustic signal.

19. The logging tool of claim 11, wherein the longitudinal displacement between the at least one monopole transmitter and the at least one monopole receiver is greater than the longitudinal displacement between the one or more sector transmitters and the respective one or more sector receivers.

20. The logging tool of claim 11, wherein the corrected amplitude values of one or more sector acoustic signals are determined by the equation:

$$\text{Correction Sector } Amp(n) = 10^{\wedge\left(\frac{Corrected\ Attn\ Value(n)}{10}\right)} * \text{Max}Amp(n)$$

where
(n) comprises the one or more sector acoustic signals,
Corrected Attn Value (n) comprises the corrected attenuation value of the (n)th sector acoustic signal, and
Max Amp (n) comprises the overall maximum measured amplitude value of the (n)th sector acoustic signal as the measured amplitude value of the (n)th sector acoustic signal varies with changes in pressure in the wellbore.

\* \* \* \* \*